United States Patent
Dobrynin et al.

(10) Patent No.: US 11,393,495 B2
(45) Date of Patent: Jul. 19, 2022

(54) READER WITH A MULTI-LAYER SYNTHETIC FERRIMAGNET FREE LAYER

(71) Applicant: Seagate Technology LLC, Fremont, CA (US)

(72) Inventors: Alexey Dobrynin, Northern Ireland (GB); Patrick Gabriel McCafferty, Springtown (GB); Kevin Anthony McNeill, Springtown (GB)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/201,289

(22) Filed: Mar. 15, 2021

(65) Prior Publication Data

US 2021/0304790 A1    Sep. 30, 2021

Related U.S. Application Data

(60) Provisional application No. 63/000,166, filed on Mar. 26, 2020.

(51) Int. Cl.
| | | |
|---|---|---|
| *G11B 5/39* | (2006.01) | |
| *H01F 41/32* | (2006.01) | |
| *H01F 10/32* | (2006.01) | |

(52) U.S. Cl.
CPC .......... *G11B 5/3912* (2013.01); *G11B 5/3906* (2013.01); *G11B 5/3909* (2013.01); *H01F 10/3272* (2013.01); *H01F 41/32* (2013.01)

(58) Field of Classification Search
None
See application file for complete search history.

(56) References Cited

U.S. PATENT DOCUMENTS

| | | | |
|---|---|---|---|
| 5,408,377 A | 4/1995 | Gurney et al. | |
| 5,751,521 A | 5/1998 | Gill | |
| 6,201,673 B1 * | 3/2001 | Rottmayer | G11B 5/3903 |
| | | | 360/324.12 |
| 6,946,697 B2 | 9/2005 | Pietambaram et al. | |
| 7,130,166 B2 * | 10/2006 | Gill | G11B 5/3932 |
| | | | 360/324.11 |
| 7,235,408 B2 | 6/2007 | Janesky et al. | |
| (Continued) | | | |

FOREIGN PATENT DOCUMENTS

EP       1625589 B1    4/2008

OTHER PUBLICATIONS

Lee, S. et al., "Current-induced magnetization switching of synthetic antiferromagnetic free layer in magnetic tunnel junctions", Journal of Applied Physics, vol. 109, No. 7 C904, ISSN—00218979, https://doi.org/10.1063/1.3562214, Submitted: Sep. 24, 2010; Accepted: Dec. 14, 2010; Published Online: Mar. 21, 2011.

(Continued)

*Primary Examiner* — Jefferson A Evans
(74) *Attorney, Agent, or Firm* — Westman, Champlin & Koehler, P.A.

(57) ABSTRACT

An apparatus includes a read sensor having a trilayer synthetic ferrimagnet free layer and at least one side shield positioned proximate to the trilayer synthetic ferrimagnet free layer. The at least one side shield provides a bias magnetic field in a first direction to bias the trilayer synthetic ferrimagnet free layer.

18 Claims, 5 Drawing Sheets

(56) References Cited

U.S. PATENT DOCUMENTS

| | | | |
|---|---|---|---|
| 7,561,385 B2* | 7/2009 | Nakamura | H01L 43/08 360/324.12 |
| 7,612,970 B2 | 11/2009 | Gill et al. | |
| 8,497,538 B2 | 7/2013 | Pietambaram et al. | |
| 9,042,061 B2 | 5/2015 | Dimitrov et al. | |
| 9,245,548 B2 | 1/2016 | Shiimoto et al. | |
| 9,401,162 B1 | 7/2016 | Gao et al. | |
| 9,548,446 B2 | 1/2017 | Park et al. | |
| 9,659,586 B1 | 5/2017 | Sapozhnikov et al. | |
| 9,830,935 B1 | 11/2017 | Gao et al. | |
| 11,152,048 B1* | 10/2021 | Prasad | G11C 11/1657 |
| 2002/0191348 A1* | 12/2002 | Hasegawa | B82Y 25/00 |
| 2008/0094880 A1* | 4/2008 | Sugibayashi | G11C 11/15 365/158 |
| 2008/0205130 A1 | 8/2008 | Sun et al. | |
| 2009/0262465 A1* | 10/2009 | Hatatani | G11B 5/3909 360/319 |
| 2009/0268353 A1* | 10/2009 | Carey | B82Y 10/00 360/324.12 |
| 2010/0072524 A1* | 3/2010 | Huai | B82Y 25/00 257/295 |
| 2011/0069417 A1* | 3/2011 | Kawamori | G01R 33/098 |
| 2011/0109397 A1* | 5/2011 | Delaet | G11C 11/161 331/157 |
| 2013/0164549 A1 | 6/2013 | Nishioka | |
| 2015/0255135 A1* | 9/2015 | Tran | G11C 11/161 365/158 |
| 2017/0076743 A1* | 3/2017 | Hassan | G11B 5/313 |
| 2021/0044254 A1* | 2/2021 | Rode | H01L 43/12 |

OTHER PUBLICATIONS

Saito, M, et al., "PtMn single and dual spin valves with synthetic ferrimagnet pinned layers", Journal of Applied Physics, vol. 85 Issue 8, ISSN—00218979, http://doi.org/10.1063/1.369145, pp. 4928-4930, Apr. 15, 1999; Published Online: Apr. 21, 1999.

Saito, M, et al., "PtMn spin valve with synthic ferrimagnet free and pinned layers", Journal of Applied Physics vol. 87, No. 9, https://doi.org/10.1063/1.372904, May 1, 2000; Published Online: Apr. 28, 2000.

* cited by examiner

READER WITH A MULTI-LAYER SYNTHETIC FERRIMAGNET FREE LAYER

CROSS-REFERENCE TO RELATED APPLICATION

This application claims priority to U.S. Provisional Application No. 63/000,166, filed on Mar. 26, 2020, the content of which is hereby incorporated in its entirety.

SUMMARY

In one embodiment, a reader is provided. The reader includes a read sensor having a multi-layer synthetic ferrimagnet free layer. The multi-layer synthetic ferrimagnet free layer has a non-zero net magnetization that enables biasing of the multi-layer synthetic ferrimagnet free layer.

In another embodiment, a method of forming a reader is provided. The method includes forming a read sensor by forming a multi-layer synthetic ferrimagnet free layer having a non-zero net magnetization that enables biasing of the multi-layer synthetic ferrimagnet free layer.

In yet another embodiment, an apparatus is provided. The apparatus includes a read sensor having a trilayer synthetic ferrimagnet free layer and at least one side shield. The at least one side shield provides a bias magnetic field in a first direction to bias the trilayer synthetic ferrimagnet free layer.

Other features and benefits that characterize embodiments of the disclosure will be apparent upon reading the following detailed description and review of the associated drawings.

DETAILED DESCRIPTION OF ILLUSTRATIVE EMBODIMENTS

Embodiments of the disclosure relate to a reader that employs a multi-layer synthetic ferrimagnet as its free layer. However, prior to providing additional details regarding the different embodiments, a description of an illustrative operating environment is provided below.

Figure 1:
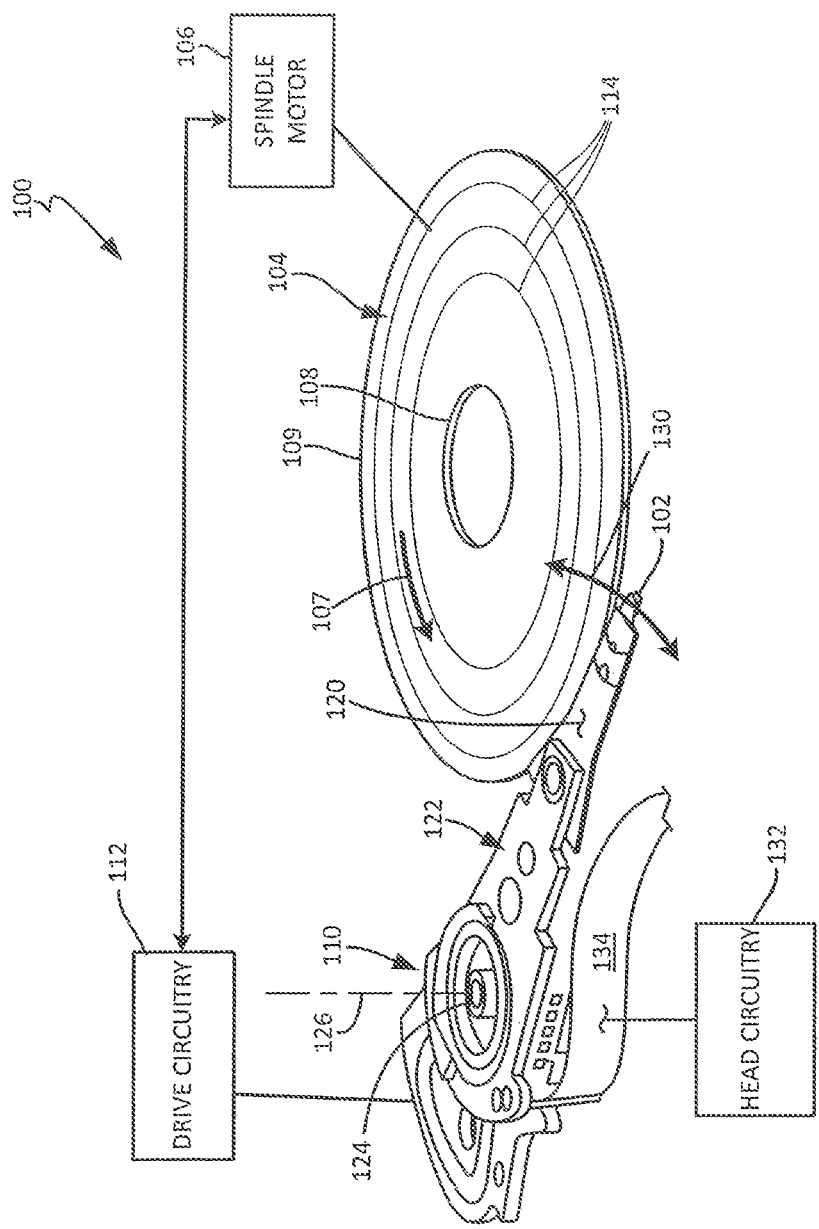
FIG. 1 is a schematic illustration of a data storage system including a data storage medium and a head for reading data from and/or writing data to the data storage medium.

FIG. 1 shows an illustrative operating environment in which certain embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1 is a schematic illustration of a data storage device 100 including a data storage medium and a head for reading data from and/or writing data to the data storage medium. In data storage device 100, head 102 is positioned above storage medium 104 to read data from and/or write data to the data storage medium 104. In the embodiment shown, the data storage medium 104 is a rotatable disc or other magnetic storage medium that includes a magnetic storage layer or layers. For read and write operations, a spindle motor 106 (illustrated schematically) rotates the medium 104 as illustrated by arrow 107 and an actuator mechanism 110 positions the head 102 relative to data tracks 114 on the rotating medium 104 between an inner diameter 108 and an outer diameter 109. Both the spindle motor 106 and actuator mechanism 110 are connected to and operated through drive circuitry 112 (schematically shown). The head 102 is coupled to the actuator mechanism 110 through a suspension assembly which includes a load beam 120 connected to an actuator arm 122 of the mechanism 110 for example through a swage connection. Although FIG. 1 illustrates a single load beam coupled to the actuator mechanism 110, additional load beams 120 and heads 102 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 102 in a cross-track direction as illustrated by arrow 130.

The head 102 includes one or more transducer elements (not shown in FIG. 1) coupled to head circuitry 132 through flex circuit 134. Details regarding elements of a head such as 102 are provided below in connection with FIG. 2.

Figure 2:
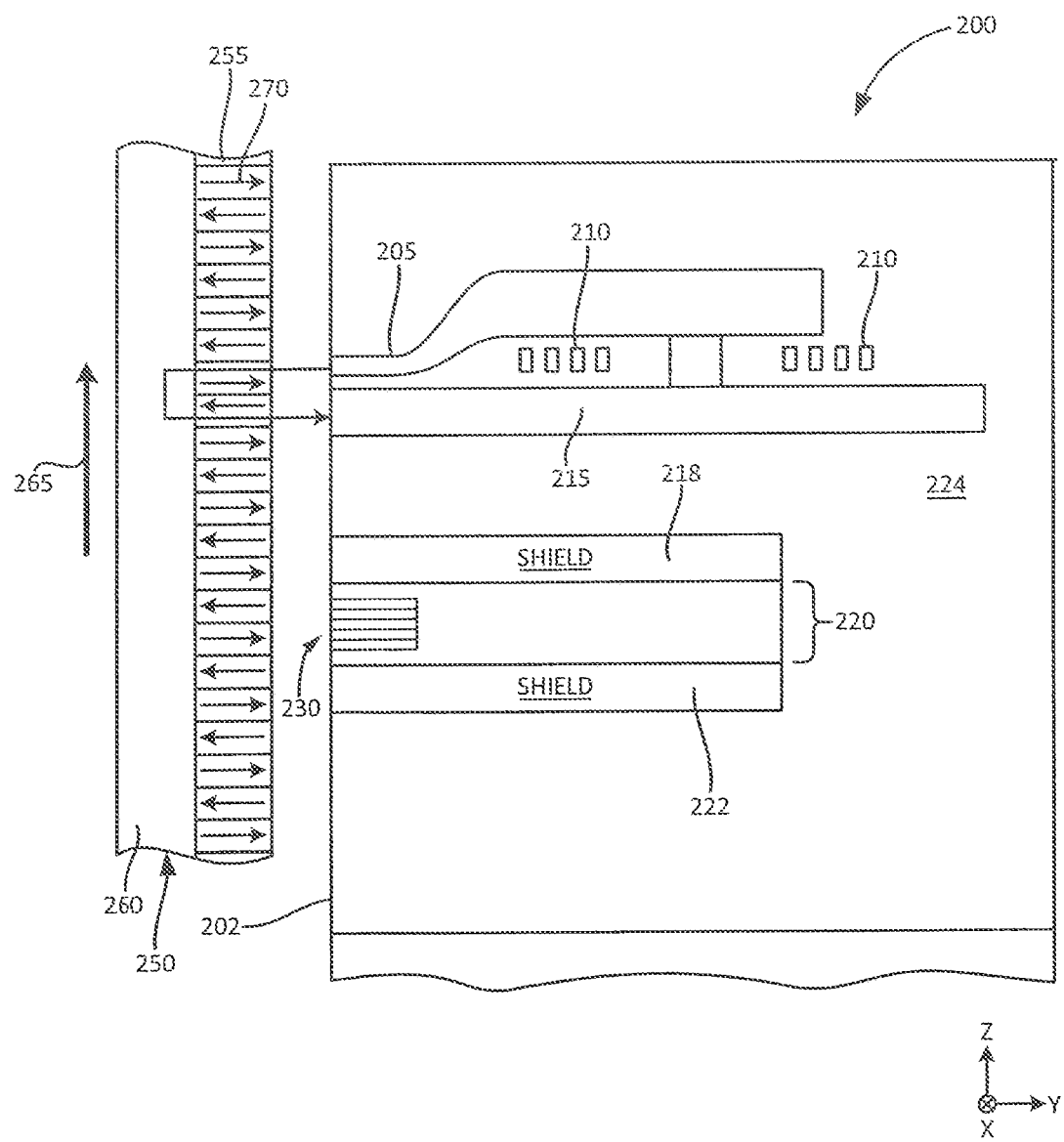
FIG. 2 is a schematic diagram of a cross-section of one embodiment of a recording head that reads from and writes to a storage medium.

FIG. 2 is a schematic diagram showing a cross-sectional view of portions of a recording head 200 and a data storage medium 250 taken along a plane substantially normal to a plane of a bearing surface (for example, an air bearing surface (ABS)) 202 of recording head 200. The recording head elements shown in FIG. 2 are illustratively included in a recording head such as recording head 102 in FIG. 1. Medium 250 is illustratively a data storage medium such as medium 104 in FIG. 1. Those skilled in the art will recognize that recording heads and recording media commonly include other components. Embodiments of the present disclosure are not limited to any particular recording heads or media. Embodiments of the present disclosure may be practiced in different types of recording heads and media.

Recording head 200 includes a write pole 205, a magnetization coil 210, a return pole 215, a top shield 218, a read transducer 220, a bottom shield 222 and a wafer overcoat 224. Storage medium 250 includes a recording layer 255 and an underlayer 260. Storage medium 250 rotates in the direction shown by arrow 265. Arrow 265 is illustratively a direction of rotation such as arrow 107 in FIG. 1.

In an embodiment, electric current is passed through coil 210 to generate a magnetic field. The magnetic field passes from write pole 205, through recording layer 255, into underlayer 260, and across to return pole 215. The magnetic field illustratively records a magnetization pattern 270 in recording layer 255. Read transducer 220 senses or detects magnetization patterns in recording layer 255, and is used in retrieving information previously recorded to layer 255.

To address certain challenges that are discussed below, read transducer or reader 220 includes a read sensor that employs a multi-layer synthetic ferrimagnet 230 as its free layer. In different reader embodiments, layers of the read sensor may be stacked along a track direction (e.g., a z-direction in FIG. 2). A track width direction is perpendicular to the z-direction or track direction (e.g., a cross-track direction, which is an x-direction in FIG. 2). A y-direction in FIG. 2 is then defined as a direction that is perpendicular to x and z simultaneously, which is a stripe-height direction. Details regarding challenges posed by new data storage technologies, and how employing sensors having multi-layer synthetic ferrimagnet free layers address such challenges are described below in connection with FIGS. 3A-5.

Recent data storage technologies, such as heat-assisted magnetic recording (HAMR), push for ever higher reader down-track and cross-track resolution. This implies a reduction of the free layer size, which leads to signal-to-noise ratio (SNR) degradation due to higher magnetic noise. Furthermore, free layer thickness reduction means a higher contribution of spin transfer torque (STT) to noise, and hence further SNR degradation. To address these challenges, a structure and composition of the free layer is adjusted in embodiments of the disclosure.

In one embodiment, the free layer is a composite structure that includes three ferromagnetic (FM) layers separated by metallic spacer layers providing antiferromagnetic (AFM) coupling between adjacent FM layers, such as in a synthetic antiferromagnetic (SAF) structure. Such a trilayer represents a synthetic ferrimagnet structure as it has a non-zero net magnetization to provide a bias to the free later by side shields. One trilayer synthetic ferrimagnet free layer embodiment is described below in connection with FIGS. 3A and 3B.

Figure 3A:
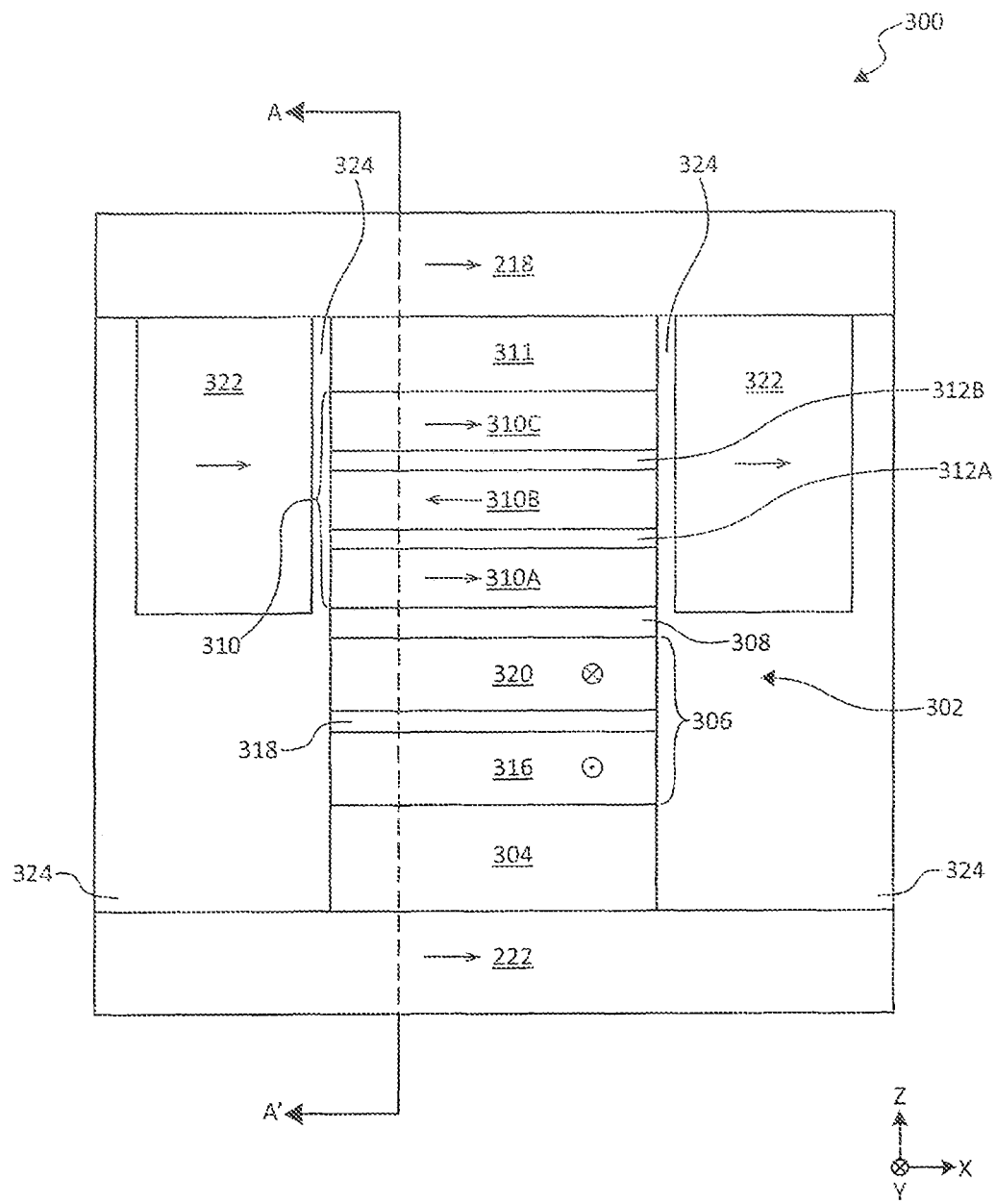
FIG. 3A is a bearing surface view of a magnetic reproducing device in accordance with one embodiment.
Figure 3B:
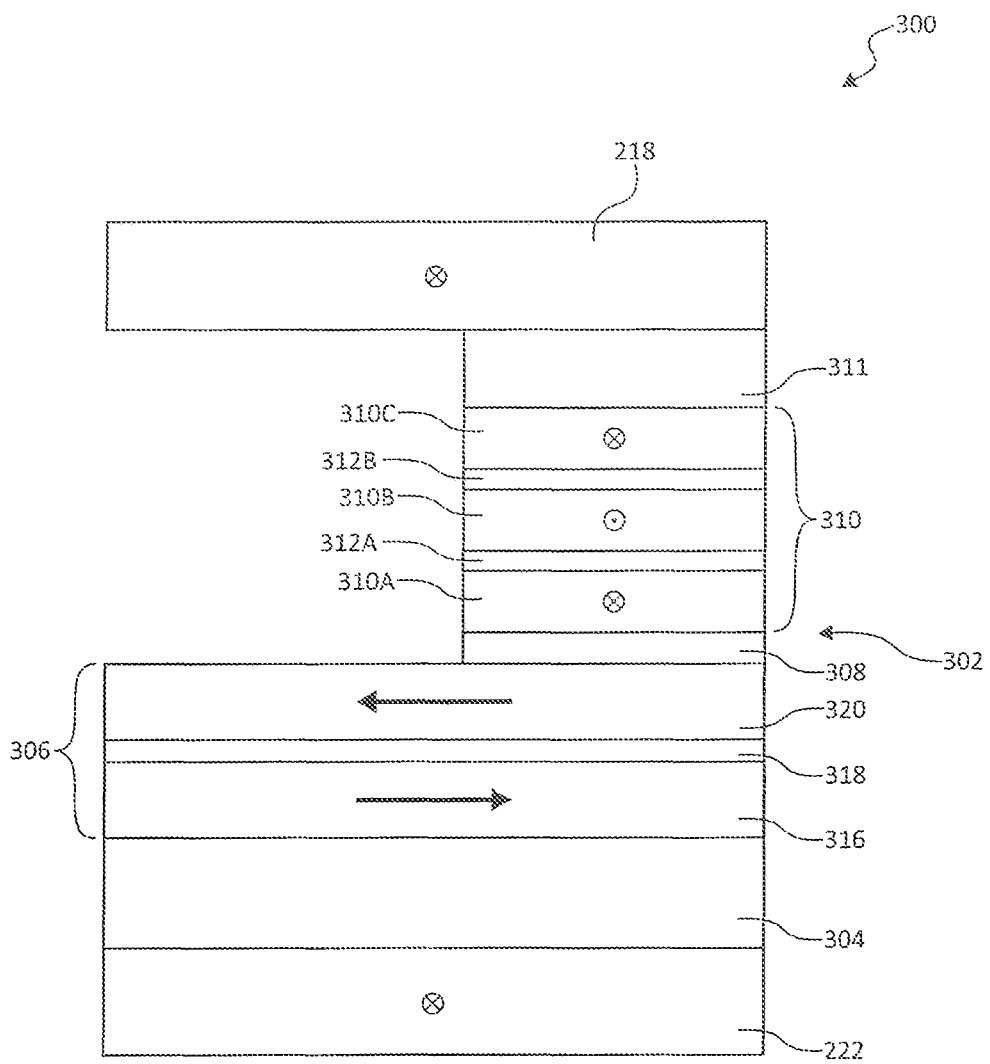
FIG. 3B is a sectional view of a portion of the embodiment of the magnetic reproducing device of FIG. 3A.

FIG. 3A is a schematic block diagram illustrating a bearing surface view of an example embodiment of read head 300 including a synthetic ferrimagnet free layer structure. FIG. 3B is a sectional view along line A-A' of FIG. 3A of portions of read head 300. Referring to FIGS. 3A and 3B, read head 300 includes a magnetoresistive sensor 302 that is positioned between top shield 218 and bottom shield 222. Top and bottom shields 218 and 222, which may be made of a material having high magnetic permeability, reduce or substantially block extraneous magnetic fields, such as, for example, those from adjacent bits on data discs from impacting the magnetoresistive sensor 302, thus improving the performance of the magnetoresistive sensor 302. In one implementation, the top and bottom shields 218 and 222 permit magnetic fields from the bit directly under magnetoresistive sensor 302 to affect the magnetoresistive sensor 302, and thus be read. It should be noted that top shield 218 may be a single pinned layer or a bottom layer of a SAF structure.

The magnetoresistive sensor 302 includes a plurality of layers including a sensor AFM layer 304, a sensor stack SAF structure 306, a tunneling barrier layer 308 and a trilayer synthetic ferrimagnet free layer 310. A stack cap layer 311 may also be included above the trilayer synthetic ferrimagnet free layer 310.

In the embodiment shown in FIG. 3A, the sensor SAF structure 306 includes a pinned layer 316 a thin separation layer 318, which may comprise a metal such as ruthenium (Ru) in some embodiments, and a reference layer 320. The magnetic moments of each of the pinned layer 316 and the reference layer 320 are not allowed to rotate under magnetic fields in the range of interest (for example, magnetic fields generated by the bits of data stored on the data discs). The magnetic moments of the reference layer 320 and the pinned layer 316 are generally oriented normal to the plane (e.g., the y direction) of FIG. 3A and anti-parallel to each other.

As indicated above, instead of employing a bulk/solid free layer, sensor 302 includes trilayer synthetic ferrimagnet free layer 310. In the embodiment of FIGS. 3A and 3B, trilayer synthetic ferrimagnet free layer 310 includes a bottom FM layer 310A, a middle FM layer 310B, and a top FM layer 310C. The bottom FM layer 310A and the middle FM layer 310B are separated by a first spacer layer 312A, and the middle FM layer 310B and the top FM layer 310C are separated by a second spacer layer 312B. Spacer layers 312A and 312B may be formed of a metal such as ruthenium (Ru). In the embodiment of FIGS. 3A and 3B, the magnetic moments of layers 310A, 310B and 310C are generally oriented parallel to the plane (e.g., in the x direction) of FIG. 3A, with the magnetization orientation of layer 310B being opposite to that of layers 310A and 310C. Magnetization orientations of bottom magnetic layer 310A and top magnetic layer 310B are set by side shields 322. Side shield 322 biases are sufficiently small, however, that the magnetic moment of the trilayer synthetic ferrimagnet free layer 310 can change in response to an applied magnetic field, such as a magnetic field of a data bit stored on the data discs. In some embodiments, the side shields 322 are formed of one or more layers of soft magnetic material (e.g., material that can be easily magnetized and demagnetized at relatively low magnetic fields). The soft magnetic material may be an alloy comprising Ni and Fe or Co and Fe. The magnetoresistive sensor 302 is separated and electrically isolated from the side biasing magnets 322 by an isolation layer 324 including, for example, insulating materials. Isolation layer 324 may also be present in other regions of head 300 as shown in FIG. 3A. It should be noted that, in some embodiments, side biasing permanent magnets may be utilized instead of side shield 322. In embodiments of the disclosure, a spontaneous magnetization (Ms) of a material utilized for the middle magnetic layer 310B is lower (e.g., substantially lower) than that of layers 310A and 310C, in order to avoid significant reduction of the free layer bias by the side shields 322.

In some embodiments, sensor 302 may utilize tunnel magnetoresistance (TMR). In embodiments that utilize TMR effects, tunneling barrier layer 308 separates the SAF structure 306 from the trilayer synthetic ferrimagnet free layer 310. The tunneling barrier layer 308 is sufficiently thin that quantum mechanical electron tunneling occurs between reference layer 320 in the SAF structure 306 and the trilayer synthetic ferrimagnet free layer 310. The electron tunneling is electron-spin dependent, making the magnetic response of the magnetoresistive sensor 302 a function of the relative orientations and spin polarizations of the SAF structure 306 and the trilayer synthetic ferrimagnet free layer 310. The highest probability of electron tunneling occurs when the magnetic moments of the SAF structure 306 and the trilayer synthetic ferrimagnet free layer 310 are parallel, and the lowest probability of electron tunneling occurs when the magnetic moments of the SAF structure 306 and the trilayer synthetic ferrimagnet free layer 310 are antiparallel. Accordingly, the electrical resistance of the magnetoresistive sensor 302 changes in response to an applied magnetic field. The data bits on the data discs in the disc drive may be magnetized in a direction normal to the plane of FIG. 3A, either into the plane of the figure, or out of the plane of the figure. Thus, when the magnetoresistive sensor 302 passes over a data bit, the magnetic moments of the trilayer synthetic ferrimagnet free layer 310 are rotated either into the plane of FIG. 3A or out of the plane of FIG. 3A, changing the electrical resistance of the magnetoresistive sensor 302. The value of the bit being sensed by the magnetoresistive sensor 302 (for example, either 1 or 0) may therefore be determined based on the current flowing from a first electrode (not shown) to a second electrode (not shown) connected to the magnetoresistive sensor 302.

One advantage of the above-described design as compared to a standard (e.g., bulk) free layer is better confinement of the free layer's magnetization to the XY plane due to increased shape anisotropy of each constituent layer. This improves coherence of the free layer's response to the media field, by reducing sensitivity to the media field components, not aligned along the Y direction, and thus improves the reader's linear resolution. Another advantage is mitigation of the effects of spin transfer torque (STT) on noise. STT originates from spin polarised current in proximity to the tunnel barrier, and it provides a significant contribution to magnetic noise. One technique to depolarize current is to employ a SAF structure. Hence, the above-described design provides reduced current polarisation for the middle FM layer 310B and further reduced STT for the top FM layer 310C, thus reducing STT contribution to noise and improving SNR.

Figure 4:
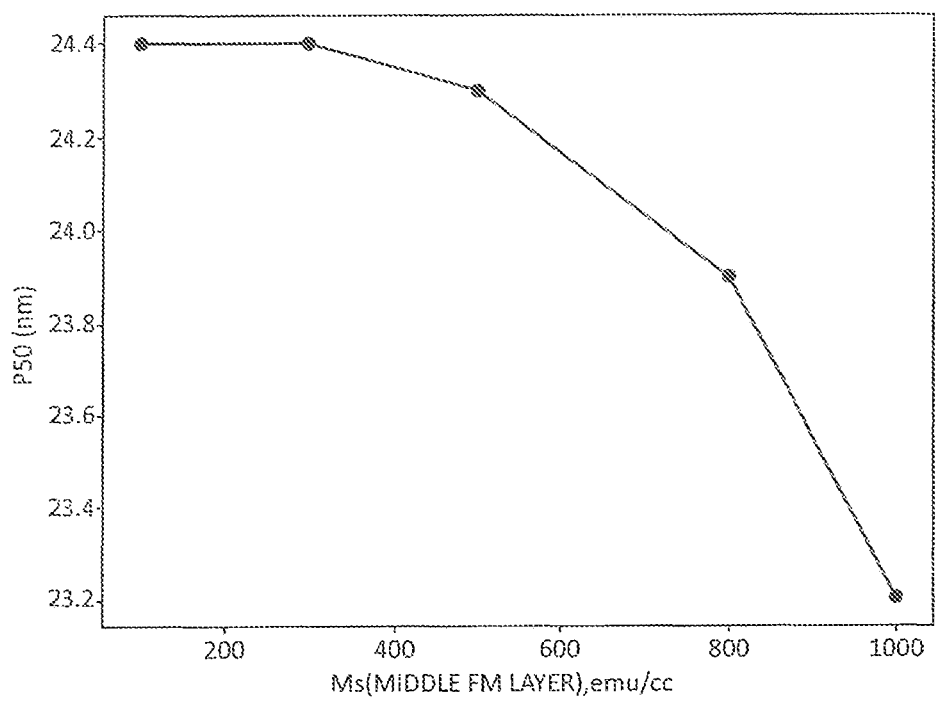
FIGS. 4 and 5 are graphs of results obtained from micromagnetic simulations of a reader with a trilayer synthetic ferrimagnet free layer.

Micromagnetic simulations of the above-described device were performed. The following parameters were used: reader width (X dimension of free layer 310)—28 nanometers (nm), stripe height (Y dimension of free layer 310)—30 nm, thickness (Z dimension of free layer 310)—3 nm, Ms of pinned layer 316—1500 emu/cc, thickness of spacer layer 318—3 nm, Ms of reference layer 320—1500 emu/cc, thickness of layer 310A—3 nm, Ms of layer 310A—1300 emu/cc, thickness of layer 310B—2 nm, Ms of layer 310B—x emu/cc (where x is varied from 100 emu/cc to 1000 emu/cc), thickness of layer 310C—2 nm, Ms of layer 310C—1300 emu/cc, and Ms of shields 218, 222 and 322—800 emu/cc. The reader's linear resolution (pulse width 50 (PW50)) as a function of Ms of the middle FM layer (e.g., 310B) is shown in FIG. 4. This is compared to the PW50 value of a standard reader having the same geometry and dimensions, but a single layer free layer, which is equal to 25.3 nm. From FIG. 4, it is clear that the gain in PW50 varies from more than 2 nm for the high Ms layer 310B to about 1 nm for low Ms layer 310B.

Figure 5:
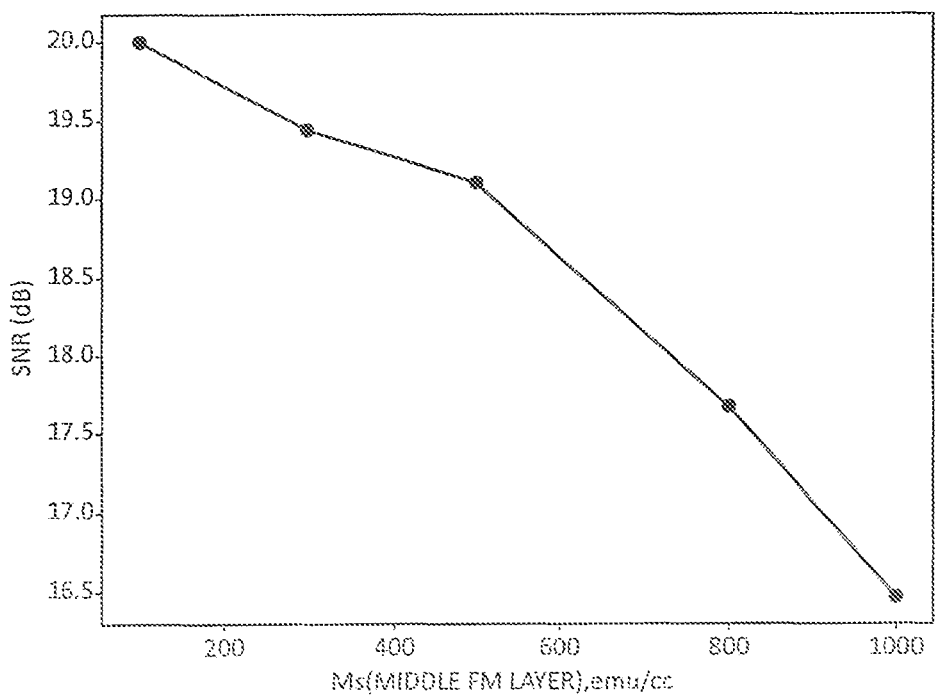

FIG. 5 is a graph showing the corresponding dependence of signal-to-noise ratio (SNR) on the Ms of the middle FM layer (e.g., 310B). This is compared with the reference SNR value of 18.8 decibels (dB). Here, STT effects are not taken into account, and magnetic noise originates only from thermal fluctuations of magnetization at room temperature. In FIG. 5, it is seen that an SNR gain of about 1 dB is achievable for low Ms layer 310B. Reduced STT in layer 310B and layer 310C is likely to further improve the SNR.

In a reader of the type shown in FIGS. 3A and 3B, signal amplitude is found to be increased by 6% and the asymmetry is increased by 3% as compared to a reference reader with a bulk free layer. Also, a cross-track resolution in the reader of the type shown in FIGS. 3A and 3B remains unchanged relative to the cross-track resolution of the reference reader with the bulk free layer.

Other parameters that may be varied for optimal reader performance include thicknesses of layers 310A-310C, Ms of layers 310A and 310B, strength of Ruderman-Kittel-Kasuya-Yosida (RKKY) coupling via spacer layers 312A and 312B in synthetic ferrimagnet free layer 310, and the bias field, which is defined by the Ms of the side shields 322 and the side shield 322—free layer gap.

As noted above, the synthetic ferrimagnet free layer may include more than 3 layers, and the multilayer free layer's constituent layers may have different Ms values. In some embodiments, the constituent layer(s) whose magnetization is set by the side shields' bias field may have Ms greater than approximately 1 Tesla (T). CoFe alloys with different composition may be used for these layers in such embodiments. Further, in such embodiments, the layer(s) whose magnetization is oriented opposite to the side shields' bias field may have Ms not exceeding 1 T. CoFeX alloys, where X can be Ta, Zr, Hf or other doping element and where the composition of X may be varied from 1-40%, may be used to tune the magnetization to a predetermined level. NiFe alloys may be used as well.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A reader comprising:
   a read sensor comprising:
      a multi-layer synthetic ferrimagnet free layer comprising at least three magnetic layers and having a non-zero net magnetization that enables biasing of the multi-layer synthetic ferrimagnet free layer, wherein the at least three magnetic layers have alternating antiparallel magnetization orientations.

2. The reader of claim 1 and further comprising a synthetic antiferromagnetic (SAF) structure below the multi-layer synthetic ferrimagnet free layer, and a tunnel barrier layer between the multi-layer synthetic ferrimagnet free layer and the SAF structure.

3. The reader of claim 2 and wherein the multi-layer synthetic ferrimagnet free layer comprises a bottom magnetic layer over the tunnel barrier layer, a middle magnetic layer over the bottom layer, and a top magnetic layer over the middle magnetic layer, and wherein the bottom magnetic layer and the middle magnetic layer are separated by a first spacer layer and the middle magnetic layer and the top magnetic layer are separated by a second spacer layer.

4. The reader of claim 3 and further comprising at least one side shield that provides a bias magnetic field in a first direction.

5. The reader of claim 4 and wherein the bottom magnetic layer of the multi-layer synthetic ferrimagnet free layer and the top magnetic layer of the multi-layer synthetic ferrimagnet free layer have a magnetization orientation in the first direction set by the at least one side shield.

6. The reader of claim 5 and wherein the middle layer of the multi-layer synthetic ferrimagnet free layer comprises a magnetization orientation in a second direction that is opposed to the bias magnetic field in the first direction.

7. The reader of claim 3 and wherein a spontaneous magnetization of a material of the middle magnetic layer of the multi-layer synthetic ferrimagnet free layer is lower than a spontaneous magnetization of a material of the bottom magnetic layer of the multi-layer synthetic ferrimagnet free layer, and lower than a spontaneous magnetization of a material of the top magnetic layer of the multi-layer synthetic ferrimagnet free layer.

8. A method of forming a reader comprising:
   forming a read sensor by:
      forming a multi-layer synthetic ferrimagnet free layer comprising at least three magnetic layers and having a non-zero net magnetization that enables biasing of the multi-layer synthetic ferrimagnet free layer, wherein the at least three magnetic layers have alternating antiparallel magnetization orientations.

9. The method of claim 8 and further comprising forming a synthetic antiferromagnetic (SAF) structure below the multi-layer synthetic ferrimagnet free layer, and a tunnel barrier layer between the multi-layer synthetic ferrimagnet free layer and the SAF structure.

10. The method of claim 9 and wherein forming the multi-layer synthetic ferrimagnet free layer comprises forming a bottom magnetic layer over the tunnel barrier layer, forming a first spacer layer over the bottom magnetic layer, forming a middle magnetic layer over the first space layer, forming a second spacer layer over the middle magnetic layer, and forming a top magnetic layer over the second spacer layer.

11. The method of claim 10 and further comprising forming at least one side shield that provides a bias magnetic field in a first direction.

12. The method of claim 11 and further comprising setting, by the at least one side shield, magnetization orientations of both the bottom magnetic layer of the multi-layer synthetic ferrimagnet free layer and the top magnetic layer of the multi-layer synthetic ferrimagnet free layer in the first direction.

13. The method of claim 12 and further comprising setting a magnetization orientation of the middle layer of the multi-layer synthetic ferrimagnet free layer in a second direction that is opposed to the bias magnetic field in the first direction.

14. The method of claim 10 and further comprising forming the middle magnetic layer of the multi-layer synthetic ferrimagnet free layer with a material that has a spontaneous magnetization of that is lower than a spontaneous magnetization of a material with which the bottom magnetic layer of the multi-layer synthetic ferrimagnet free layer is formed, and lower than a spontaneous magnetization of a material with the top magnetic layer of the multi-layer synthetic ferrimagnet free layer is formed.

15. An apparatus comprising:
   a read sensor comprising a trilayer synthetic ferrimagnet free layer including three magnetic layers having alternating antiparallel magnetization orientations having a non-zero net magnetization that enables biasing of the trilayer synthetic ferrimagnet free layer; and
   at least one side shield that provides a bias magnetic field in a first direction to bias the trilayer synthetic ferrimagnet free layer.

16. The apparatus of claim 15 and further comprising a synthetic antiferromagnetic (SAF) structure below the trilayer synthetic ferrimagnet free layer, and a tunnel barrier layer between the trilayer synthetic ferrimagnet free layer and the SAF structure.

17. The apparatus of claim 16 and wherein the trilayer synthetic ferrimagnet free layer comprises a bottom magnetic layer over the tunnel barrier layer, a middle magnetic layer over the bottom layer, and a top magnetic layer over the middle magnetic layer, and wherein the bottom magnetic layer and the middle magnetic layer are separated by a first spacer layer and the middle magnetic layer and the top magnetic layer are separated by a second spacer layer.

18. The apparatus of claim 17 and wherein:
the bottom magnetic layer of the trilayer synthetic ferrimagnet free layer and the top magnetic layer of the trilayer synthetic ferrimagnet free layer have a magnetization orientation in the first direction set by the at least one side shield; and
the middle layer of the trilayer synthetic ferrimagnet free layer comprises a magnetization orientation in a second direction that is opposed to the bias magnetic field in the first direction.

* * * * *